June 13, 1961 F. PORTER 2,987,766
APPARATUS FOR SHAPING HIGH MOLECULAR WEIGHT THERMOPLASTICS
Filed Nov. 10, 1958
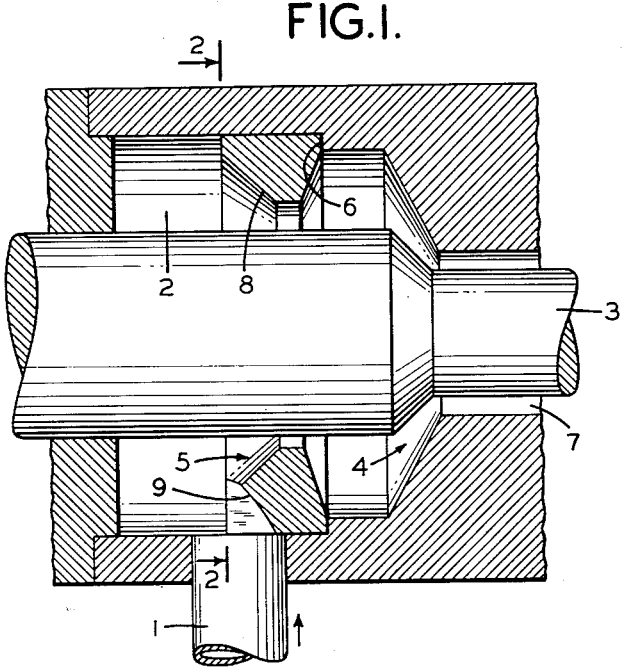
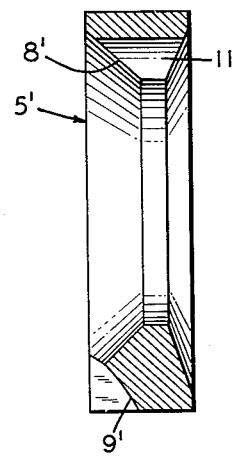
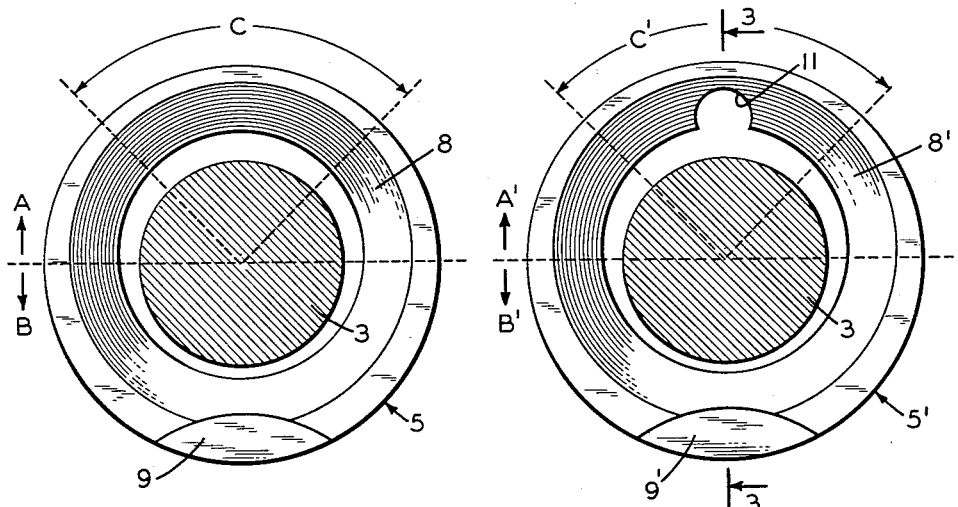
INVENTOR
FRANK PORTER
BY
Robert A. Harman
ATTORNEY United States Patent Office 2,987,766
Patented June 13, 1961

2,987,766
APPARATUS FOR SHAPING HIGH MOLECULAR WEIGHT THERMOPLASTICS
Frank Porter, Morris Township, Morris County, N.J., assignor to Allied Chemical Corporation, New York, N.Y., a corporation of New York
Filed Nov. 10, 1958, Ser. No. 772,829
3 Claims. (Cl. 18—14)

This invention relates to process and apparatus for forming by extrusion profiled shapes such as pipe, tubing and the like from high molecular weight thermoplastic; and especially relates to extruding pipe from thermoplastic high molecular weight polyethylene and like polymers which at temperatures used in the forming operations tend appreciably to depolymerize, thereby becoming increasingly fluid.

Pipe dies and the like are conventionally designed with a central core member, e.g. a mandrel or the like, which together with a surrounding outer member forms a shaping cavity. For purposes of developing uniform volume rates of delivery of plastic into the shaping cavity of such dies, it has long been the practice to employ a distributing plate placed between the shaping cavity and the feed inlet for plastic, and perpendicular to the longitudinal axis of the core member. Especially has this been necessary when, e.g. for reasons of mechanical convenience, a cross-head die is used i.e. one in which the feed inlet is set in one side of the die, at an angle to the longitudinal axis of the core member.

These distributing plates have been given a variety of forms. Some have numerous openings of relatively small ratio of diameter to length whereby substantially uniform, relatively elevated pressure is established over the whole face of the distributing plate, resulting in mixing of the plastic upstream of the plate and in relatively uniform flow rates of plastic through the distributing plate and into the shaping cavity.

Another general design for distributing plates provides openings proportioned in size to the linear rate of flow of plastic to the various areas of the plate. The plastic streams in general flow at relatively slow rates through the more remote areas of the distributing plate as a result of having encountered relatively great resistances in the relatively long paths traveled. Accordingly a sufficiently larger open area is provided in the remote areas of the distributing plate to roughly equalize the volumetric flow therethrough of the slower moving streams with that of the faster streams in the areas near the feed inlet, thereby obtaining roughly equal volumetric flows through all cross-sectional areas at the passageway into the shaping cavity, without interposing a high resistance en route.

In forming pipe and the like from high molecular weight, heat depolymerizable thermoplastics such as high density polyethylene, high molecular weight ethylene copolymers with olefinic comonomers, etc., I have observed that when temperatures are used at which depolymerization is appreciable, the use of conventionally designed distributing plates does not assure absence of weakness along a "weld" line in the shaped article, i.e. absence of a line longitudinal of the pipe or other profiled shape, along which failure develops preferentially.

I have now discovered a process and apparatus for execution thereof whereby strength of profiled shapes such as pipes of high molecular weight polyethylene and the like thermoplastics along any weld line is improved. My process comprises feeding a thermoplastic polymer, depolymerizable by heat to a more fluid thermoplastic polymer, as a liquefied stream through a feed inlet to a die comprising a head cavity, a core member, a shaping cavity downstream from the feed inlet, and a distributing plate between the feed inlet and the shaping cavity with open area forming a passageway to the shaping cavity, the feed entering at one side of the die and at an angle to the longitudinal axis of the core member; deflecting entering feed of thermoplastic away from the immediately adjacent portion of the passageway in the distributing plate; and forcing plastic to flow through the distributing plate at average volumetric rate of flow through the far half of said distributing plate, i.e. the half farther from the feed inlet, roughly equal to and preferably exceeding the average volumetric flow rate of plastic through the near half of the distributing plate.

The above specified relation of volumetric flow rates through the two halves of the distributing plate can be achieved in various ways; but the means chosen should desirably allow simple construction of all parts of the die. One simple means which I have found very effective is to employ a die of generally conventional construction and to specially shape the distributing plate to be used therein and to provide a special deflecting baffle surface on the distributing plate or separate therefrom.

The distributing plate in accordance with my invention is a type wherein an opening is provided designed to admit the core member of the die and to leave a clearance or passageway between the plate proper and the core, the opening in the plate being positioned to leave a greater area between the plate and the far side of the core member (i.e. that side farther from the feed inlet) than between the plate and the near side of the core member (nearer to the feed inlet). Such distributing plate in its usual form would be a flat disc with an off-center circular bore therein. This usual form is modified in accordance with my invention, first by giving the inlet face of the distributing plate, i.e. the exposed area of the plate facing the head cavity of the die, over at least the far quadrant thereof (that farthest from the feed inlet) an inward taper, or slope facing toward the center, at an angle between about 15° and about 75° to the central axis. The area of this slope in the far quadrant of the plate is at least about one-half the total area (exclusive of the opening) of the far quadrant of the inlet face of the plate.

Moreover the apparatus is modified further as follows:
(A) By providing a baffle shaped to deflect, away from the clearance area or passageway between the plate and the near side of the core member, a stream entering the die at the feed inlet. Suitably and conveniently this baffle is integral with the distributing plate; for example it is formed by an outer surface area of the plate designed to present an obstruction to flow through the inlet of the die and to deflect an entering liquid stream into the head cavity of the die;

(B) Preferably also by providing in the far quadrant of the distributing plate a supplementary opening or enlargement, thus adding at least about 15% clearance area in the far quadrant, beyond the total area of clearance provided when the far quadrant opening is the same size as the openings of the other three quadrants; the openings in the distributing plate being sized with a least transverse dimension at least about 10% greater than the corresponding dimension of the core member and being located to bring between ⅔ and ⅘ of the area of clearance to the far side of the core member, i.e. the side farther from the feed inlet to the die.

It has been generally recommended practice in the extrusion of polyethylene to design for minimum inventory of hot plastic in the head cavity of the die and for minimum deflection of the hot plastic in the die; whereas it will be noted that deflection of entering streams of plastic, away from the passageway in the area of the distributing plate nearest the feed inlet, is a feature of my process. While I do not intend to limit my invention by any mere theory, I believe the highly beneficial results obtained by my invention are due at least in important part to the said deflection of entering plastic; and also due in important part to the relatively rapid and complete removal of plastic from all parts of the head cavity which is effected by operations in accordance with my invention.

As has been stated above, my invention applies to shaping high molecular weight thermoplastics such as polyethylene and the like which are depolymerizable to more fluid thermoplastics at temperatures used in the shaping operations. The more fluid thermoplastic material formed in such depolymerization will be capable of more rapid flow than the fresh polymer, particularly over a path offering relatively high resistance such as a relatively long and/or relatively tortuous path.

If the path to the shaping cavity, from any particular region of the head cavity, offers considerably higher resistance to flow than offered along the paths elsewhere in the head cavity, fresh polymer reaching the particular region will tend to stagnate there, unless forced out. But as it stagnates, the polymer will progressively acquire fluidity due to its depolymerization; and at some stage of depolymerization the polymer will become capable of sufficient flow to escape from the stagnant region. The resulting stream of depolymerized material will tend to flow with little mixing into the shaping cavity and to remain as a distinct longitudinal line in the final shaped article, unless forced to intermingle with fresh polymer.

Accordingly in conventional dies of simple design as above described, in general a more or less broad line of relatively low quality polymer will appear in articles produced by operations as above, in consequence of variations in resistance among the various paths taken by the subject thermoplastics in traveling in such conventional die from feed inlet to shaping cavity. Such line will be a point of weakness when the finished article is transversely stressed as in rupture tests of pipe.

In view of the foregoing it would appear necessary, for obtaining pipe free of longitudinal lines of weakness from the subject polymers:

(a) Not only to establish roughly equal volumetric flows of polymer through all equal arcs about the passageway into the shaping cavity as heretofore recommended, (b) But also to establish roughly equal time paths of all streams of polymer for travel from the feed inlet into the shaping cavity of the die, whereby polymer with relative uniformity of quality and of molecular weight will pass, without having stagnated in the head cavity, through each cross-sectional area of the passageway into the shaping cavity;

(c) And a third requirement will be reasonably short average residence time of the polymer in the die, to avoid excessive depolymerization with resultant deterioration of quality.

It will be recognized that these simultaneous requirements are difficult of simultaneous realization, since for example equalizing the time paths of all polymer while passing roughly half the polymer into the far side of the shaping cavity will tend to lengthen average residence time of polymer in the die.

I believe that in operations in accordance with my invention the above-cited three requirements for forming, from the subject polymers, pipe and like articles free of longitudinal lines of weakness are all satisfactorily met as follows:

(1) The tapered opening in the far quadrant of my distributing plate, and the supplementary opening therein when used, promote relatively rapid flow of polymer out of the region of the head cavity farthest from the feed inlet, thereby tending to draw incoming fresh polymer toward said farthest regions and away from the passageway area adjacent the feed inlet. Thereby the time paths of incoming polymer streams from inlet to shaping cavity are correspondingly lengthened, but not unduly so; and simultaneously the time paths of the polymer occupying the regions of the head cavity farthest from the feed inlet are very materially shortened and the desired rough equality of volumetric flows of polymer is maintained through all equal arcs about the passageway into the shaping cavity.

(2) The baffle forces circulation of fresh polymer into the regions of the head cavity farthest from the feed inlet, thus promotes movement of any stagnating polymer out of these regions with corresponding shortening of the time paths in these regions, bringing the time paths of all polymer in the die toward equalization.

(3) The supplementary opening in the far quadrant of the plate, providing a passageway of area as above specified, permits increased volumetric flow of polymer through the far side, especially the far quadrant of the passageway into the shaping cavity. Since the streams passing through this far side and far quadrant will tend to contain the more highly depolymerized polymer, it is beneficial to properties of the finished article to cause such streams to spread out within the head cavity and shaping cavity, as will tend to result from increased volumetric flow rates of these streams. However, this effect should not be carried to the point of starving the near side of the shaping cavity with consequent poor formation of a joint on the near side; and is not carried to that extreme in operations in accordance with my invention.

The flows through the passageway into the shaping cavity in operations as above described can be checked in various ways, e.g. by feeding two successive polymer charges of different colors e.g. black and red through the die. When time paths of substantial proportions of the polymer from inlet to shaping cavity are much longer than for the polymer as a whole, the color first used (say black) will remain observable for periods of three days and longer, as one or more well-defined longitudinal bands or lines in the article such as a pipe, gradually diminishing in width and/or in depth through the pipe wall, until it finally fades out. With the desired flows, on the other hand, the first color will be practically completely displaced within at most about one day, thereafter forming at most only a thin line not over about $1/16$ inch wide and of depth not exceeding half the wall thickness of the article.

A line of weakness in high molecular weight polyethylene and like thermoplastic pipe, etc., can be detected by a "ring pull" test wherein sample cross-sections ½ inch wide (e.g. ½ inch wide rings from round pipe) are cut out and are stretched between two holders by separating the holders at a standard rate. Failure of the test samples at a tensile stress or at an elongation less than standard (as established by previous like testing of articles having satisfactory strength) correlates with weakness of the article in rupture tests. Moreover such weakness can be associated with a definite longitudinal line in the article. This weld line shows up to the trained eye as a shiny line, upon heating the article to about 160° C.; probably the shininess is due to the content of relatively low molecular weight polymer. Weakness of the subject articles in rupture tests can be correlated with failures along this line, when this line is relatively wide and relatively easily seen. Thus standards for estimating strength along these weld lines in articles from the subject polymers can be established by checking width and appearance of said lines after heating versus results of rupture tests.

The accompanying drawings diagrammatically illustrate the apparatus of my invention.

FIG. 1 is a view partly in section taken along the longitudinal axis of a cross-head die, in the plane through the center of the feed inlet into the die. This figure illustrates the general organization and certain details of apparatus in accordance with my invention.

FIG. 2 is a section showing the inlet face of a distributing plate in accordance with my invention, and relation of the plate to the core member 3 of the die.

FIGS. 3 and 4 show a preferred distributing plate in accordance with my invention, FIG. 3 being in cross-section and FIG. 4 being similar to FIG. 2.

In FIG. 1 is shown a cross-head die comprising feed inlet 1; head cavity 2; core member 3; shaping cavity 4; distributing plate 5 fitting on supporting shoulder 6; and die orifice 7 with certain details of the distributing plate as described below.

FIG. 2 illustrates a distributing plate, shown as bisected into the "far" and "near" halves A and B and segmented into the "far" quadrant C. The plate has the general form of a disc in which is an off center circular bore, designed to give clearance around core member 3. The inward taper around the bore of my distributing plate is illustrated at 8 in the figures. As is shown in the figures, this taper will generally cover substantially all the exposed area of the "far" quadrant C of the distributing plate. Suitably as shown in FIG. 2 this taper has an angle of about 30°–60°, and extends around the whole circular inside periphery of the distributing plate. In the drawings this tapered surface is shown as having a straight line as generatrix, but forms will be used in some circumstances having curved generatrices, convex and concave.

In the region of the distributing plate adjoining the feed inlet 1 is a sloping baffle or deflecting surface indicated by 9 in the figures, sloping toward the upstream end of the head cavity. Suitably this surface slopes at an angle of about 30°–60° from the inlet face of the distributing plate and has the form of a cylindrical trough. However it can take a wide variety of forms and can be integral with distributing plate 5 as shown or can be accessory to the distributing plate or a separate element.

In FIGS. 3 and 4 is shown a preferred form of my distributing plate, which is like the plate of FIG. 2 except that a supplementary opening 11 is provided within the "far" quadrant. This opening is of a size to increase the clearance or passageway between the core member 3 and the inside periphery of the distributing plate by at least about 15% as compared to the clearance provided by the symmetrical opening of the distributing plate of FIG. 2. Moreover the clearance at the "far" side of the distributing plate of FIG. 3, the side designed to be farther from the feed inlet, is between ⅔ and ⅘ of the total area of clearance. This supplementary opening can be formed with fixed radius as illustrated in FIG. 4 or can take a variety of other forms; and can be a single passageway as shown, or can be multiple passageways, lying mainly in the "far" quadrant of the distributing plate.

As a matter of mechanical convenience the outlet face of the distributing plate can be given a taper as illustrated in FIG. 1. As shown in FIG. 1, the distributing plate can be given a taper as illustrated in FIG. 1. As shown in FIG. 1, the distributing plate is suitably held by a press fit in head cavity 2, bearing against shoulder 6. The plate is thus easily removable. The plate diameter will thus be almost the diameter of the head cavity in the die being used, and must be at least sufficient to allow for the desired diameter of the main opening and the desired taper angle around the main opening, while maintaining suitable plate thickness at the outer periphery, usually at least about ½ inch.

An important consideration in large scale practical operations for extruding pipe and the like is that performance be stable, i.e. consistently good under normal fluctuations of operating conditions such as temperature, pressure, extrusion rate, cooling rate, etc., as encountered in large scale operations over extended periods of time. As illustrated by the example below of operation in accordance with my invention, my invention gives very good results with high consistency over test periods such as a full week.

The example illustrates my invention in the best form contemplated by me and describes completely a specific embodiment thereof, but it is not intended to limit the invention to all details of the example.

*Example*

A polyethylene blend for production of pipe was fed into an apparatus of the type illustrated in FIG. 1 of the drawings. The blend was made up as follows:

High molecular weight polyethylene having melt index (measured by ASTM procedure D–1238–52T modified to use a temperature of 590° F. and a weight of 27.5 lbs.) of about 0.05 gram per 10 minutes; having melting point measured by disappearance of double refraction of about 135° C.; having specific gravity of about 0.945; and having molecular weight of approximately 2,000,000 as measured by the Ivan Harris method (Journal of Polymer Science, Vol. VIII, No. 4 (1952), pages 358–361); 76 parts by weight;

Low molecular weight wax type polyethylene of the type described in Erchak U.S. Patent 2,712,534, Example 3, 21.5 parts;

Carbon black, pigment grade, 2.5 parts;

Anti-oxidant (sym.-di-beta-naphthyl-para-phenylene-diamine), 0.025 part.

Melt index of the blend measured by ASTM procedure D–1238–52T (modified to use a temperature of 590° F. and a weight of 27.5 lbs.) was about 0.13–0.14 gram per 10 minutes.

Small amounts of water, roughly about ½ percent by weight of the above plastic blend, were added to the pelleted blend at the extruder hopper whereby improved smoothness of extrusion was obtained.

The temperature in the melt ranged from about 590° F. to about 610° F. and pressures ranged from about 3000 to about 4000 p.s.i.

The extruded pipe was cooled both internally and externally, after issuing from the die orifice, by a water jacketed outer tube and inner core.

The mandrel had diameter of 1.5 inches, forming pipe of 1½ inches inside diameter.

The distributing plate had the preferred construction illustrated in FIGS 3 and 4 above. The diameter of its bore (neglecting the circular enlargement thereof in the far quadrant) was 1.75 inches, i.e. about 17% greater than the diameter of the mandrel. The clearance provided by the diameter of the bore alone, neglecting the circular enlargement thereof, between the pipe-forming mandrel and the distributing plate was 0.080 inch adjacent the feed inlet, leaving 0.170 inch at the far side from the feed inlet.

The area of the circular enlargement amounted to 25% beyond the total area of clearance provided by the bore alone, apart from the enlargement. The enlargement was cut on a radius of about ⅜ inch, and extended back about ½ inch into the plate. The area of clearance at the near side of the mandrel, afforded by the bore in the distributing plate, was 28% of the total clearance including the enlargement; leaving 72% of the total on the far side of the mandrel.

The taper around the inlet side of the bore in the distributing plate made an angle of about 40° with the face or 50° with the axis through the center of the bore perpendicular to the face. The outward sloping baffle surface was in the form of a cylindrical trough about 1¼ inches wide and about ⅝ inch deep, sloping at an angle of about 40° from the face of the distributing plate.

Over the course of 170 hours, 11,600 ft. of 1½ inch pipe was produced. Only a minimum of maintenance and adjustment was required during the run, indicating smooth, stable operation.

The pipe produced was examined by cutting sample rings and heating them in an oven at 160° C. After this treatment it was possible by close observation to see thin weld lines, shinier than the rest of the pipe. All the weld lines were of good to excellent strength, based on standard tests.

By contrast, when a flat distributing plate providing no deflecting surface for incoming polymer and having no enlargement of the far quadrant of the bore is used, not more than about 25% of test samples of pipe, produced otherwise essentially as above, will pass standard tests for good weld lines. Use of a plate with a tapered bore and a deflecting surface as above, but without an enlargement in the far quadrant, leads to distinct improvement over the results with the flat plate, so that under favorable conditions up to 70% of test samples show good weld lines in operations as above.

I claim:

1. A die for extrusion of pipe and like profiled shapes of high molecular weight, heat depolymerizable thermoplastic polymer which comprises in combination, a head cavity; a core member; a feed inlet entering said head cavity at one side and at an angle to the longitudinal axis of the core member; a shaping cavity downstream from the feed inlet; and a distributing plate perpendicular to the longitudinal axis of the core member and surrounding the core member between the feed inlet and the shaping cavity with an opening providing a passageway along the core member for flow of plastic to the shaping cavity; said passageway having a greater clearance area on the side farther from the feed inlet, the opening in said distributing plate, on the inlet side, being tapered in at least the quadrant farthest from the feed inlet with a taper angle between about 15° and about 75°; and a deflecting baffle presenting an obstruction in the feed inlet and shaped to deflect an entering liquid stream toward the upstream end of the head cavity.

2. Apparatus as defined in claim 1, wherein the distributing plate has equal open areas in the three quadrants nearer the feed inlet and in the fourth quadrant the open area includes an enlargement which provides at least 15% additional clearance area, around the core member, beyond the total clearance area which would be provided by the equal areas of the opening in the three nearer quadrants plus an opening in the fourth quadrant having the same area as for each of the other three quadrants; the opening in the distributing plate surrounding the core member having a least transverse dimension at least about 10% greater than the corresponding dimension of the core member; and the openings being located to bring between ⅔ and ⅘ of the clearance area to the side of the core member farther from the feed inlet; the taper being around the whole inner periphery of the distributing plate opening, exclusive of portions cut out in forming the enlargement and deflecting baffle, and having an angle of about 30°–60°.

3. Apparatus as defined in claim 2 wherein the deflecting baffle is integral with the distributing plate and has deflecting surface sloping at an angle of about 30°–60° from the inlet face of the distributing plate.

References Cited in the file of this patent

UNITED STATES PATENTS

| | | |
|---|---|---|
| 1,679,545 | Roth | Aug. 7, 1928 |
| 2,633,602 | Sverdrup | Apr. 7, 1953 |
| 2,766,481 | Henning | Oct. 16, 1956 |